April 14, 1936. R. G. FEAR 2,037,124
DUAL CAM INTERMITTENT MOVEMENT
Filed March 16, 1931 2 Sheets-Sheet 1
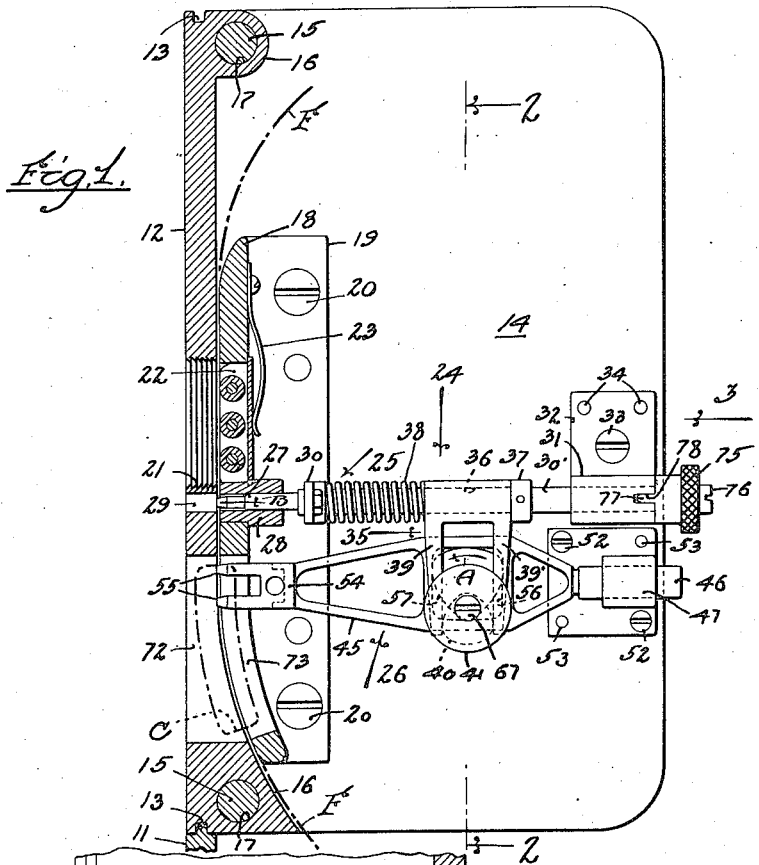

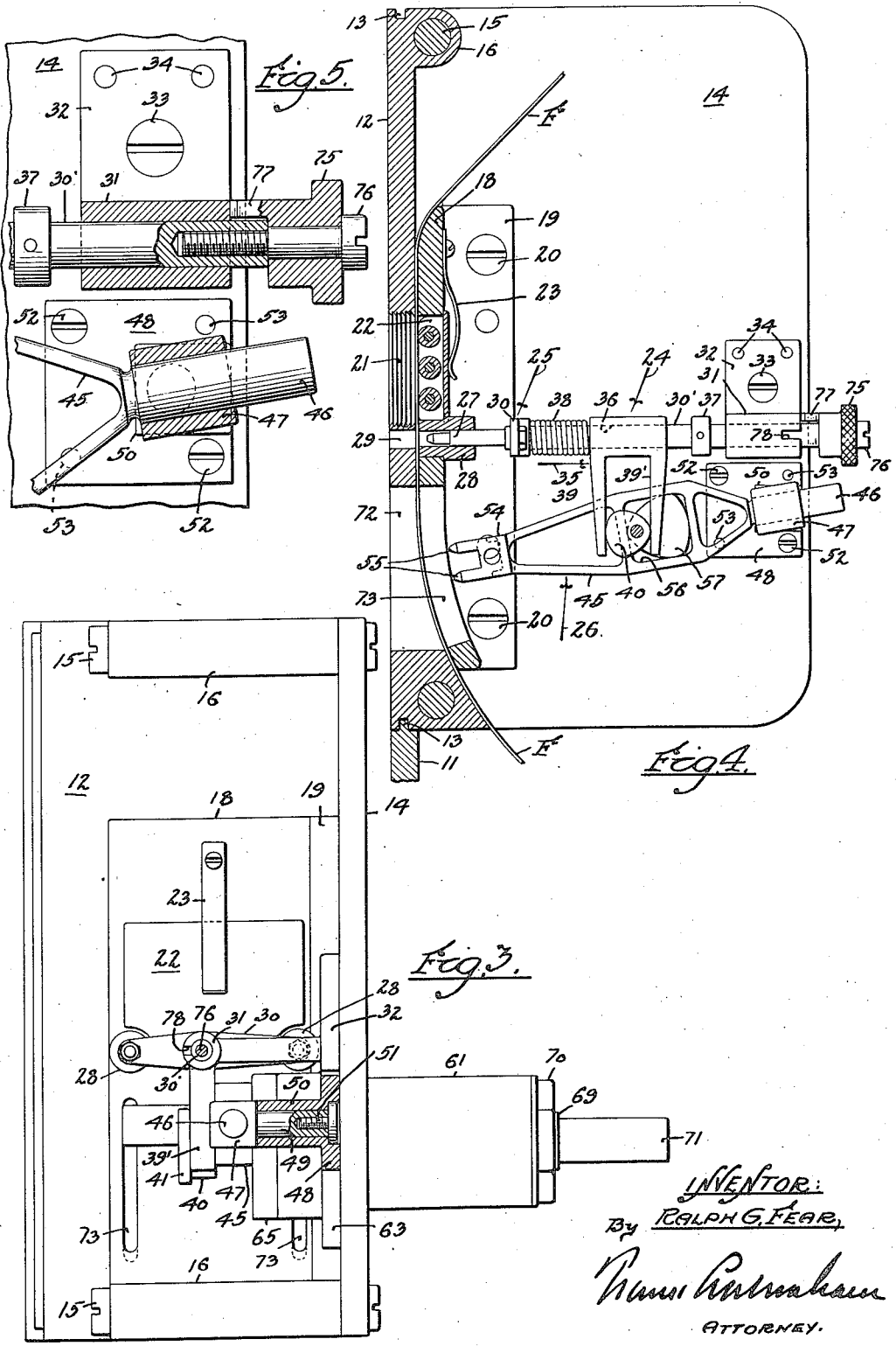

Patented Apr. 14, 1936

2,037,124

UNITED STATES PATENT OFFICE 2,037,124

DUAL CAM INTERMITTENT MOVEMENT

Ralph G. Fear, Hollywood, Calif.

Application March 16, 1931, Serial No. 522,806

7 Claims. (Cl. 88—18.4)

This invention has to do with mechanical movements and is more particularly related to that type of mechanical movement ordinarily used in motion picture photographing and projecting machines, which is known as an intermittent movement.

It is well known to those familiar with the art that in the usual type of motion picture camera the film is intermittently advanced in front of an aperture where it is momentarily held stationary while the shutter is opened and closed. This alternate movement and pause of the film is effected through the medium of a mechanism which consists in a general way of a shuttle fork adapted to enter the film, advance it through a predetermined distance and then be withdrawn from the film and moved to the point of entry. For the purpose of holding the film stationary while the shuttle fork is being moved from its withdrawal to its entry point, a pilot pin is ordinarily employed, such pin being operated in synchronism with the shuttle fork and adapted to enter and leave perforations in the film just as the shuttle fork is leaving and entering its corresponding perforations.

Various means have been developed for effecting a synchronous operation of the shuttle fork and the pilot pin and it is a novel form of such mechanism which forms the subject matter of the present invention.

It is obviously important in the construction of a device of this kind that the pilot pin and the shuttle fork must be operated in perfect synchronism. In other words, the pilot pin must be completely withdrawn before a downward movement is imparted to the film by the shuttle fork. At the same time the pilot pin must be just entering the perforations in the film as the claws of the shuttle fork are leaving its corresponding perforations. It therefore becomes an important object of this invention to produce a mechanism of the class described which is positive and accurate in its operation, and in which the pilot pin and shuttle fork are operated in perfect synchronism.

It was pointed out above that it was an object of this invention to produce a mechanism in which the pilot pin and the shuttle fork were operated in perfect synchronism, and I have found that this object is best accomplished by operating the pilot pin and the shuttle fork directly from a common source of power. In my Patent No. 1,850,955 issued March 22, 1932, I show a device for accomplishing this object which embodies a single harmonic cam associated with a link and lever system for operating both the shuttle fork and the pilot pin. In my Patent No. 1,840,353 I disclose a mechanism in which the shuttle fork and the pilot pin are operated from a wheel crank and a lever member and the present application is directed toward a mechanism which employs what I have termed a dual cam or a pair of cams offset relative to each other and rigidly associated with a common operating shaft. One of these cams is arranged to operate the shuttle fork and the other operates the pilot pin, and since both cams are rigidly mounted upon a common shaft there is no opportunity for the means operating the two movable members to become out of adjustment or out of synchronism.

It is a noteworthy feature of this invention that I have constructed the pilot pin in a manner such that it may be easily withdrawn from an operating position to facilitate the threading of the camera.

It is a further object of this invention to produce a device of the class described which is silent in its operation.

The details in the construction of a preferred form of my invention, together with other objects attending its production, will be best understood from the following description of the accompanying drawings which are chosen for illustrative purposes only, and in which—

Fig. 1 is a sectional elevation taken through an aperture plate of a motion picture camera embodying my invention;

Fig. 2 is a sectional elevation which may be considered as having been taken in a plane represented by the line 2—2 in Fig. 1;

Fig. 3 is an end elevation with parts in section taken in the direction of the arrow 3 in Fig. 1;

Fig. 4 is a sectional elevation similar to Fig. 1 but showing the pilot pin and shuttle fork as having been moved to a camera threading position;

Fig. 5 is an enlarged sectional elevation showing details in the construction of the pilot pin and shuttle fork bearings.

Referring to the drawings, reference numeral 11 indicates a portion of the front plate of the camera which supports an aperture plate 12 by means of dove-tail connections 13.

A supporting plate 14 is secured to the aperture plate 12 at substantially right angles thereto by means of screws or pins 15 which extend through a sleeve 16 and a passage 17 in the top and bottom portions of the aperture plate. Reference numeral 18 indicates a guide or bushing plate which is provided with a flanged portion 19 whereby it is secured to the supporting plate through the medium of screws 20.

It will be noted that the guide plate 18 is spaced rearwardly a slight distance behind the aperture plate 12 so as to permit the downward movement of a film F between these two plates. The film F moves downwardly before an aperture of the usual type provided in the aperture plate 12, and indicated by reference numeral 21. The guide plate 18 is provided with a pressure plate 22 which is situated behind the aperture 21 and is pressed inwardly toward the film by means of a spring finger 23. This is the usual construction employed in motion picture cameras.

The mechanism which forms the subject matter of this invention is generally indicated by reference numeral 24 and comprises a pilot member 25 and a shuttle member 26. The pilot member 25 consists of a pair of pilot pins 27 which are slidably received in bushings 28 provided in the guide plate 18. The bushings 28 are situated opposite recesses 29 formed in the aperture plate for permitting the inward movement of the pilot pin through perforations in the film. The rear end portions of the pilot pins 27 are secured to a yoke or bracket 30 which in turn is mounted on the end portion of a pilot pin operating bar 30'.

The bar 30' has its rear end portions slidably supported in a sleeve member 31 which is shown as being formed upon a plate 32 secured to the supporting plate 14 by means of a screw 33 and pins 34. The movement of the pilot member is effected through the medium of a fork 35 which is formed with a sleeve at its upper end having a passage 36 therethrough through which the pilot pin operating bar 30' slidably extends. The operating bar 30' is provided with a stop collar 37 which limits the forward movement of the operating bar relative to the fork and a coil spring 38 is interposed between the forward end of the fork and the yoke 29 on the end portion of the bar 30' for transmitting motion from the fork 35 to the bar 30'. The fork 35 is shown as having a pair of downwardly projecting legs 39 and 39', such legs being in sliding engagement with a harmonic cam 40 and being held against outward movement relative to the cam 40 by a guide plate 41. The harmonic cam 40 is rigidly attached to a drive shaft 42, the construction and operation of which will be hereinafter more fully described.

The shuttle member 25 which is used to move the film downwardly past the aperture 21 after the pilot pins 28 have been removed from the perforations of the film, comprises a fork 45 which has a pin 46 formed on its rear end portion, such pin being slidably received by a block 47 which is swingably or rotatably mounted in a hub plate 48. In this form of my invention the block 47 is shown as being provided with a cylindrical pin 49 which is held in a sleeve 50 on the plate 48 by means of screws 51. The plate 48 is shown as being secured to the supporting plate 14 by means of screws 52 and pins 53. The outer end portion of the fork 45 is shown as being provided with a claw member 54 which has prongs 55 adapted to engage the perforations in the motion picture film.

At an intermediate point the fork 45 is provided with a substantially square opening 56 which receives a shuttle fork operating cam 57. This cam is shown as being in the form of a harmonic cam similar to the cam 40 and is angularly offset through substantially 180° with respect to the cam 40. The cam 57, like the cam 40, is rigidly attached to the shaft 42.

In this form of my invention the shaft 42 is shown as being supported by bearings 60 and 60' mounted in a sleeve 61, which extends through an aperture 62 in the supporting plate 14 and is secured to the supporting plate through the medium of a flange 63 and screws 64. The inner end portion of the shaft 42 is provided with a disc or wheel member 65 which is shown as being formed integrally with the cam 57.

In the form shown the cam 40 is made separate from the remainder of the shaft and is secured thereto by means of a pin 66 and a screw 67 which passes through the guide plate 41. The outer end portion of the shaft 42 is shown as being threaded as indicated at 69 to receive a retaining nut 70, and it is also provided with an extension 71 for receiving a crank or other suitable driving mechanism.

In the operation of the mechanism contemplated by this invention, assuming the shaft to be rotating in the direction of the arrow A in Fig. 1, and the parts to be in the position shown in Fig. 1, at which the pilot pin is just leaving the perforations in the film and the claws of the shuttle fork are just entering their corresponding perforations, it will be observed that the continued movement of the shaft will carry the pilot pins a slight distance to the rear in the direction of the arrow B, and that the claws of the shuttle fork, in view of the fact that the shuttle fork is both swingably and slidably mounted upon the supporting plate, will move through the slots 72 and 73 in the aperture plate and the guide plate respectively through the general path indicated by the dot and dash lines in Fig. 1. When the shuttle fork has reached the bottom of its course as indicated at C, the harmonic cam 57 engaging the square opening 56 therein will withdraw the claws of the shuttle fork from the film and at the same time the cam 40 engaging the leg 39 of the fork 35 will advance the pilot pin into a perforation in the film.

It will be apparent from the operation described above that this mechanism operates with a smooth sliding engagement of all surfaces throughout and that there are no gears or other similar mechanism to make its operation noisy.

It was mentioned as a noteworthy feature of this invention that the pilot pin was constructed so that it might be withdrawn from a film engaging position irrespective of the position of the fork 35 and its operating cam 40. This is accomplished by slidably mounting the fork upon the pilot pin operating bar and providing the coil spring 38 for carrying the movement of the fork to the pilot pins. The outer end portion of the pilot pin operating bar is provided with a knob 75 which is rotatably mounted upon the bar by means of a screw 76 and is provided with a tongue 77 adapted for reception in a notch 78 in the sleeve member 31. When the pilot pin is to be withdrawn for threading the camera, the knob 75 is merely pulled rearwardly until the tongue 77 is withdrawn from the notch 78. It is then turned through a slight angle to bring the tongue into a position such as that shown in Fig. 4 where the pilot pin is held out of engagement with the film. The shuttle fork may then be rotated to a position such as the one shown in Fig. 4 where the passage between the aperture plate and the guide plate is cleared for feeding the film downwardly therethrough.

It is to be understood that while I have herein described and illustrated one preferred form of my invention, the invention is not limited to the precise construction described above, but includes within its scope whatever changes fairly come within the spirit of the appended claims.

I claim as my invention:

1. A mechanical movement of the class described, comprising a supporting plate, a bearing member on said plate, a drive shaft mounted in said bearing member, a pair of offset cams rigidly attached to said shaft, a shuttle fork having a portion in sliding engagement with one of said cams, an operating bar slidably mounted on said plate, a pilot pin carried at one end of said bar, an operating fork for said bar in sliding engagement with the other of said cams, yieldable means for transmitting motion from said operating fork to said bar, and means on the opposite end of said bar for withdrawing and holding the pilot pin from its engagement with a film.

2. A mechanism for intermittently moving motion picture film, comprising an aperture plate, a supporting plate at right angles to said aperture plate, a guide plate in spaced relation with said aperture plate, bushings in said guide plate, pilot pins slidably mounted in said bushings, a sleeve member on said supporting plate, an operating bar for said pilot pins extending through said sleeve member and having one end portion attached to said pilot pins, a fork slidably mounted on said bar, cam means for reciprocating said fork, yieldable means for transmitting motion from said fork to said bar for intermittently moving said pilot pins into perforations in a film situated between said aperture plate and said guide plate, and means for intermittently moving said film when said pilot pins are withdrawn from the perforations.

3. A mechanism for intermittently moving motion picture film, comprising an aperture plate, a supporting plate at right angles to said aperture plate, a guide plate in spaced relation with said aperture plate, bushings in said guide plate, pilot pins slidably mounted in said bushings, a sleeve member on said supporting plate, an operating bar for said pilot pins extending through said sleeve member, a supporting member for said pilot pins at one end of said bar, a fork slidably mounted on said bar, yieldable means interposed between said fork and said supporting member for transmitting motion in one direction from said fork to said bar to intermittently move said pilot pins into perforations in a film situated between said aperture plate and said guide plate, a stop on said bar to be engaged by said fork when it is moved in the other direction for withdrawing said pilot pins from the perforations, and means operated in synchronism with said cam and fork for moving said film when said pilot pins are withdrawn.

4. The mechanism as set forth in claim 1, wherein a locking means is cooperative with said means for withdrawing and holding said pilot pin out of film engaging position to free said film for movement.

5. In a mechanism for intermittently moving a film relative to the aperture plate of a motion picture camera, an operating bar, a pilot pin carried at one end of said bar for intermittently engaging the film, means for reciprocating said bar, resilient means on said bar for transmitting the motion of said reciprocating means thereto, a handle carried at the opposite end of said bar for manually moving the bar to effect a withdrawal of said pilot pin from film engaging position and against the tension of said resilient means, and means for locking said bar against the urge of said resilient means tending to return said pilot pin to film engaging position.

6. The mechanism as set forth in claim 5, wherein said bar locking means is in the nature of a slot formed in a stationary part adjacent said bar and a lug carried by the bar and engaged in said slot and the bar is first moved endwise to effect a withdrawal of said pilot pin from its engagement with the film and thereafter rotated to cause said lug to engage an edge of the stationary part.

7. A mechanical movement of the class described, comprising a drive shaft, a shuttle fork for intermittently advancing a film, a slidably mounted bar, an operating member slidably engaged with said bar, means operable from said drive shaft for actuating said shuttle fork and said operating member in timed relation, a pilot pin at one end of said bar, yieldable means on said bar for transmitting the motion of said operating member thereto, and means at the opposite end of said bar for withdrawing and holding the pilot pin from its engagement with the film.

RALPH G. FEAR.